United States Patent
Wu

(10) Patent No.: US 10,750,563 B2
(45) Date of Patent: Aug. 18, 2020

(54) DEVICE AND METHOD FOR HANDLING A FALLBACK

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/407,151

(22) Filed: May 8, 2019

(65) Prior Publication Data

US 2019/0350029 A1 Nov. 14, 2019

Related U.S. Application Data

(60) Provisional application No. 62/669,363, filed on May 9, 2018, provisional application No. 62/669,353, filed on May 9, 2018.

(51) Int. Cl.
*H04W 76/19* (2018.01)
*H04W 36/00* (2009.01)
(Continued)

(52) U.S. Cl.
CPC ....... *H04W 76/19* (2018.02); *H04W 36/0069* (2018.08); *H04W 48/16* (2013.01); *H04W 76/27* (2018.02)

(58) Field of Classification Search
CPC ............. H04W 36/0069; H04W 76/19; H04W 36/0079; H04W 48/16; H04W 76/27
See application file for complete search history.

(56) References Cited

U.S. PATENT DOCUMENTS

| 2010/0255838 A1* | 10/2010 | Wu | H04W 48/16 455/434 |
| 2014/0029458 A1* | 1/2014 | Ye | H04L 5/0053 370/252 |

(Continued)

OTHER PUBLICATIONS

3GPP TS 38.331 V15.1.0 (Mar. 2018); 3rd Generation Partnership Project; Technical Specification Group Radio Access Network; NR; Radio Resource Control (RRC) protocol specification (Release 15).

(Continued)

*Primary Examiner* — Asad M Nawazi
*Assistant Examiner* — Syed Ali
(74) *Attorney, Agent, or Firm* — Winston Hsu

(57) ABSTRACT

A network comprising a first centralized unit (CU) and a first distributed unit (DU) for handling a fallback comprises at least one storage device for storing instructions and at least one processing circuit coupled to the at least one storage device. The at least one processing circuit is configured to execute the instructions stored in the at least one storage device. The instructions comprise the first CU receiving a first INITIAL UPLINK (UL) RADIO RESOURCE CONTROL (RRC) MESSAGE TRANSFER message from the first DU, wherein the first INITIAL UL RRC MESSAGE TRANSFER message comprises a first RRCReestablishmentRequest message received from a first communication device, and a first CellGroupConfig for the first communication device; and the first CU transmitting a first DOWNLINK (DL) RRC MESSAGE TRANSFER message to the first DU, wherein the first DL RRC MESSAGE TRANSFER message comprises a RRCSetup message, and the RRCSetup message comprises the first CellGroupConfig.

10 Claims, 5 Drawing Sheets

(51) Int. Cl.
*H04W 48/16* (2009.01)
*H04W 76/27* (2018.01)

(56) References Cited

U.S. PATENT DOCUMENTS

| | | | |
|---|---|---|---|
| 2014/0029594 A1* | 1/2014 | Lee | H04W 72/0446 370/336 |
| 2015/0327199 A1* | 11/2015 | Wu | H04W 76/27 370/336 |
| 2016/0135095 A1* | 5/2016 | Wu | H04W 36/0061 370/328 |
| 2017/0134996 A1* | 5/2017 | Wang | H04L 63/0428 |
| 2019/0045551 A1* | 2/2019 | Wu | H04W 16/28 |
| 2019/0045566 A1* | 2/2019 | Wu | H04L 5/001 |
| 2019/0141773 A1* | 5/2019 | Kim | H04W 76/19 |
| 2019/0245738 A1* | 8/2019 | Wu | H04W 76/10 |
| 2019/0357109 A1* | 11/2019 | Wu | H04W 36/0069 |
| 2019/0386770 A1* | 12/2019 | Wei | H04L 1/0061 |

OTHER PUBLICATIONS

3GPP TS 38.473 V15.1.0 (Mar. 2018); 3rd Generation Partnership Project; Technical Specification Group Radio Access Network; NG-RAN; F1 application protocol (F1AP) (Release 15).

3GPP TS 38.470 V15.1.0 (Mar. 2018); 3rd Generation Partnership Project; Technical Specification Group Radio Access Network; NG-RAN; F1 general aspects and principles (Release 15).

3GPP TSG-RAN WG2 Meeting #101bis R2-1806455; Sanya, China, Apr. 16-20, 2018; Agenda item: 11.1; Source: Qualcomm Incorporated (Rapporteur); Title: IAB U-plane considerations for architecture group 1; Document for: Information.

3GPP TSG-RAN WG2 Meeting #101bis R2-1804849; Sanya, China, Apr. 16-20, 2018; Agenda item: 11.1; Source: Qualcomm Inc, KDDI, AT&T, Nokia, Nokia Shanghai Bell, Huawei, Ericsson, Intel, LG Electronics, CMCC, Samsung; Title: Way Forward—IAB Architecture for L2/3 relaying; Document for: Information.

3GPP TSG-RAN3#99bis R3-181832; Sanya, China, Apr. 16-20, 2018.

3GPP TSG-RAN3 Meeting #99b R3-181836; Sanya, China, Apr. 16-20, 2018.

3GPP TS 38.300 V15.1.0 (Mar. 2018); 3rd Generation Partnership Project; Technical Specification Group Radio Access Network; NR; NR and NG-RAN Overall Description; Stage 2 (Release 15).

3GPP TS 36.331 V15.1.0 (Mar. 2018); 3rd Generation Partnership Project; Technical Specification Group Radio Access Network; Evolved Universal Terrestrial Radio Access (E-UTRA); Radio Resource Control (RRC); Protocol specification (Release 15).

* cited by examiner

US 10,750,563 B2

1

DEVICE AND METHOD FOR HANDLING A FALLBACK

CROSS REFERENCE TO RELATED APPLICATIONS

This application claims the benefit of U.S. Provisional Applications No. 62/669,353 filed on May 9, 2018 and No. 62/669,363 filed on May 9, 2018, which are incorporated herein by reference.

BACKGROUND OF THE INVENTION

1. Field of the Invention

The present invention relates to a device and a method used in a wireless communication system, and more particularly, to a device and a method of handling a fallback.

2. Description of the Prior Art

A disaggregated base station (BS) consists of a centralized unit (CU) and at least one distributed unit (DU). When a radio resource control (RRC) reestablishment procedure or a RRC resume procedure is performed, how to perform a fallback to the RRC establishment for the disaggregated BS is still unknown.

SUMMARY OF THE INVENTION

The present invention therefore provides a device and method for handling a fallback to solve the abovementioned problem.

A network comprising a first centralized unit (CU) and a first distributed unit (DU) for handling a fallback comprises at least one storage device for storing instructions and at least one processing circuit coupled to the at least one storage device. The at least one processing circuit is configured to execute the instructions stored in the at least one storage device. The instructions comprise the first CU receiving a first INITIAL UPLINK (UL) RADIO RESOURCE CONTROL (RRC) MESSAGE TRANSFER message from the first DU, wherein the first INITIAL UL RRC MESSAGE TRANSFER message comprises a first RRCReestablishmentRequest message or a first RRCResumeRequest message received from a first communication device, and comprises a first CellGroupConfig for the first communication device; and the first CU transmitting a first DOWNLINK (DL) RRC MESSAGE TRANSFER message to the first DU, in response to the first INITIAL UL RRC MESSAGE TRANSFER message, wherein the first DL RRC MESSAGE TRANSFER message comprises a RRCSetup message, and the RRCSetup message comprises the first CellGroupConfig.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
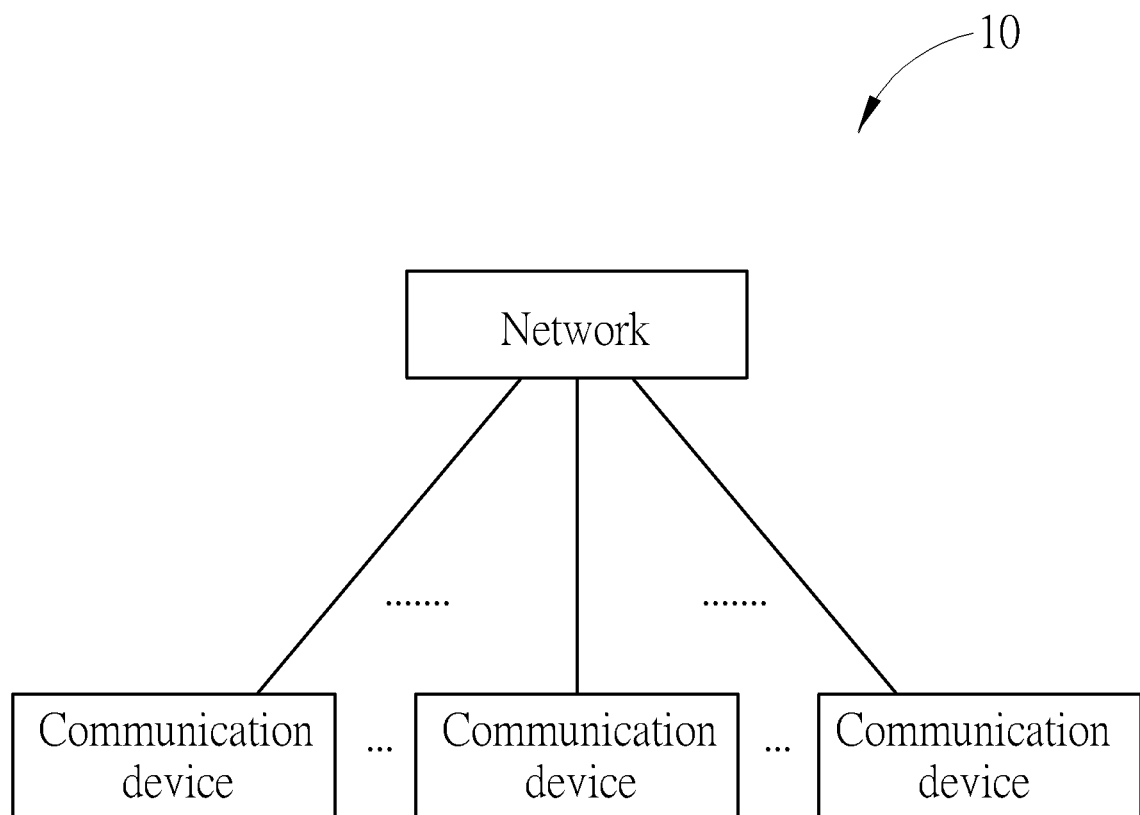
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication device are simply utilized for illustrating the structure of the wireless communication system 10. The network may include a fifth-generation (5G) radio access network (RAN) and a 5G core (5GC). The 5G RAN may include at least one next-generation Node-B (gNB). The network may include a sixth-generation (6G) RAN including a 6G base station (BS) and a 6G core (6GC) or a 5GC. The 6G BS performs transmissions and receptions of orthogonal frequency-division multiplexing (OFDM), filtered OFDM (F-OFDM), Generalized Frequency Division Multiplexing (GFDM), Universal Filtered Multi-Carrier (UFMC) or Filter Bank Multi-Carrier (FBMC) symbols. The network may also include a 6GC.

Figure 2:
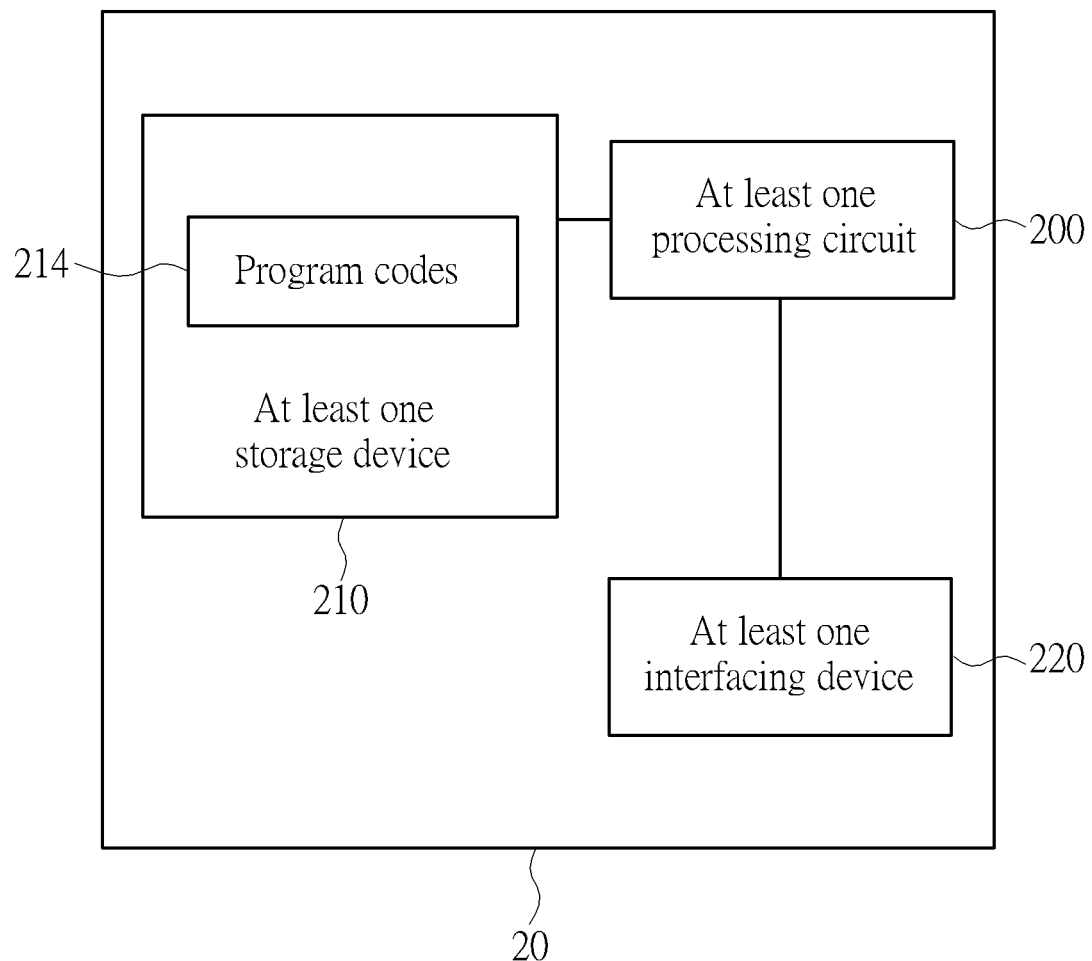
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

In the following examples, a UE is used for representing a communication device in FIG. 1, to simplify the illustration of the examples.

Figure 3:
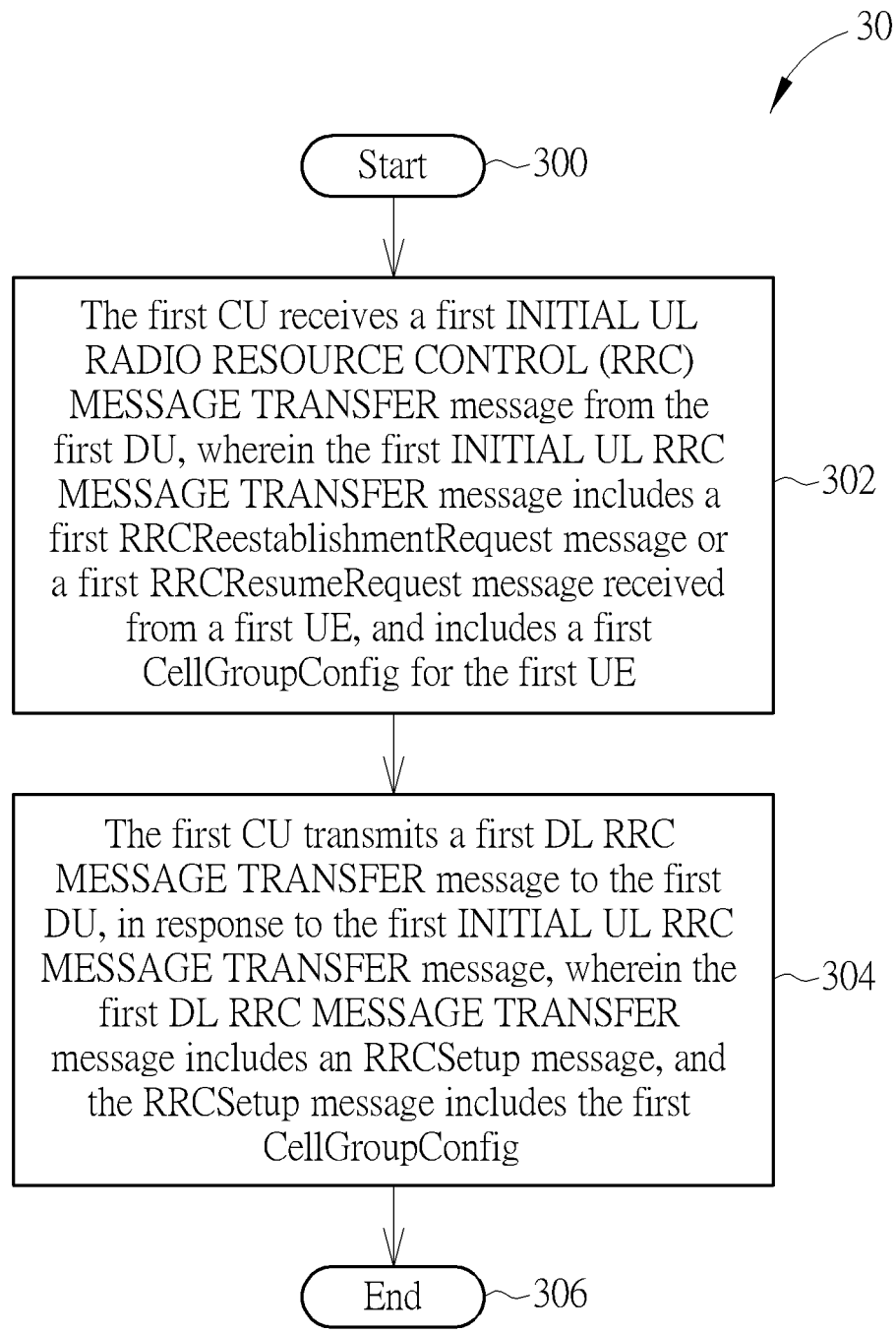
FIG. 3 is a flowchart of a process according to an example of the present invention.

A process 30 in FIG. 3 is utilized in a network including a first centralized unit (CU) and a first distributed unit (DU) to handle a fallback, and includes the following steps:

Step 300: Start.

Step 302: The first CU receives a first INITIAL UPLINK (UL) RADIO RESOURCE CONTROL (RRC) MESSAGE TRANSFER message from the first DU, wherein the first INITIAL UL RRC MESSAGE TRANSFER message includes a first RRC Reestablishment Request (RRCReestablishmentRequest) message or a first RRC Resume Request (RRCResumeRequest) message received from a first UE, and includes a first cell group configuration (CellGroupConfig) for the first UE.

Step 304: The first CU transmits a first DOWNLINK (DL) RRC MESSAGE TRANSFER message to the first DU, in response to the first INITIAL UL RRC MESSAGE TRANS- FER message, wherein the first DL RRC MESSAGE TRANSFER message includes an RRC Setup (RRCSetup) message, and the RRCSetup message includes the first CellGroupConfig.

Step 306: End.

According to the process 30, in response to the first INITIAL UL RRC MESSAGE TRANSFER message, the first CU includes the first CellGroupConfig in the RRCSetup message, includes the RRCSetup message in the first DL RRC MESSAGE TRANSFER message, and transmits the first DU the first DL RRC MESSAGE TRANSFER message to set up the RRC connection between the first UE and the network (e.g., the first CU).

Realizations of the process 30 are not limited to the above description. The following examples may be applied to the process 30.

In one example, the first DU extracts the RRCSetup message from the first DL RRC MESSAGE TRANSFER message and transmits the RRCSetup message to the first UE. The first DU receives an RRC Setup Complete (RRCSetupComplete) message from the first UE, in response to the RRCSetup message. The first DU transmits a first UL RRC MESSAGE TRANSFER message including the RRCSetupComplete message, to the first CU.

In one example, the first UE in a RRC_CONNECTED state transmits the first RRCReestablishmentRequest message to the first DU. The first UE stays in the RRC_CONNECTED state, in response to the RRCSetup message. In another example, the first UE in a RRC_INACTIVE state transmits the first RRCResumeRequest message to the first DU. The first UE enters the RRC_CONNECTED state, in response to the RRCSetup message.

In one example, the first CU determines to generate the RRCSetup message for the first UE, if (e.g., in response to that) the first CU is not able to transmit an RRC Reestablishment (RRCReestablishment) message responding to the first RRCReestablishmentRequest message or a RRC Resume (RRCResume) message responding to the first RRCResumeRequest message, to the first UE. For example, the first CU may not have a UE access-stratum (AS) context of the first UE. Therefore, the first CU does not transmit the RRCReestablishment message or the RRCResume message to the first UE via the first DU.

In one example, the first CU receives a second INITIAL UL RRC MESSAGE TRANSFER message from the first DU. The second INITIAL UL RRC MESSAGE TRANSFER message includes a second RRCReestablishmentRequest message or a second RRCResumeRequest message from a second UE, and includes a second CellGroupConfig for the second UE. The second UE in the RRC_CONNECTED state transmits the second RRCReestablishmentRequest message to the first DU. The second UE in the RRC_INACTIVE state transmits the second RRCResumeRequest message to the first DU. If the first CU has a UE AS context of the second UE, the first CU transmits a second DL RRC MESSAGE TRANSFER message to the first DU, in response to the second INITIAL UL RRC MESSAGE TRANSFER message. The second DL RRC MESSAGE TRANSFER message includes a RRCReestablishment message responding to the second RRCReestablishmentRequest message or includes an RRCResume message responding to the second RRCResumeRequest message. The first DU transmits the RRCReestablishment message or the RRCResume message to the second UE. In one example, the RRCReestablishment message or the RRCResume message includes the second CellGroupConfig. In another example, the RRCReestablishment message or the RRCResume message does not include the second CellGroupConfig. The second UE stays in the RRC_CONNECTED state and transmits an RRCReestablishmentcomplete message to the first DU, in response to the RRCReestablishment message. The second UE enters the RRC_CONNECTED state and transmits an RRCResumecomplete message to the first DU, in response to the RRCResume message. The first DU transmits a second UL RRC MESSAGE TRANSFER message including the RRCReestablishmentComplete message or the RRCResumeComplete message to the first CU.

In some implementations, after receiving the RRCReestablishmentComplete message or the RRCResumeComplete message, the first CU transmits a UE CONTEXT MODIFICATION REQUEST message to the first DU, and the first DU transmits a UE CONTEXT MODIFICATION RESPONSE message responding to the UE CONTEXT MODIFICATION REQUEST message to the first CU. The CONTEXT MODIFICATION RESPONSE message includes a third CellGroupConfig. In another example, the first CU transmits a UE CONTEXT SETUP REQUEST message to the first DU, and the first DU transmits a UE CONTEXT SETUP RESPONSE message responding to the UE CONTEXT SETUP REQUEST message to the first CU. The CONTEXT SETUP RESPONSE message includes a third CellGroupConfig. In either of the above two examples, the first CU transmits a third DL RRC MESSAGE TRANSFER message including an RRC Reconfiguration (RRCReconfiguration) message to the first DU. The first CU includes the third CellGroupConfig in the third RRCReconfiguration message. Then, the first DU transmits the RRCReconfiguration message to the second UE. The second UE transmits an RRC Reconfiguration Complete (RRCReconfigurationComplete) message to the first DU, in response to the RRCReconfiguration message. The first DU transmits a third UL RRC MESSAGE TRANSFER message including the RRCReconfigurationComplete message to the first CU. The third CellGroupConfig and the second CellGroupConfig have the same content or have different contents. The first CU may include a radio bearer configuration (RadioBearerConfig) or a measurement configuration (MeasConfig) in the RRCReconfiguration message.

In other implementations, after receiving the RRCReestablishmentComplete message or the RRCResume message, the first CU transmits a third DL RRC MESSAGE TRANSFER message including a RRCReconfiguration message to the first DU. The first DU transmits the RRCReconfiguration message to the second UE. The second UE transmits an RRCReconfigurationComplete message to the first DU, in response to the RRCReconfiguration message. The first DU transmits a third UL RRC MESSAGE TRANSFER message including the RRCReconfigurationComplete message to the first CU. In one example, the RRCReconfiguration message includes a CellGroupConfig which is transmitted to the second UE (e.g., in another RRCReconfiguration message transmitted by the first CU or another CU via a DU (e.g., the first DU or another DU)) before the second UE transmits the second RRCReestablishmentRequest message. The RRCReconfiguration message includes a RadioBearerConfig or a MeasConfig.

In one example, the first CU receives a third INITIAL UL RRC MESSAGE TRANSFER message from the first DU. The third INITIAL UL RRC MESSAGE TRANSFER message includes a third RRCReestablishmentRequest message or a third RRCResumeRequest message from a third UE, and includes a third CellGroupConfig for the third UE. The third UE in the RRC_CONNECTED state transmits the third RRCReestablishmentRequest message to the first DU. If the first CU does not have a UE AS context of the third UE, the first CU transmits a fourth DL RRC MESSAGE TRANSFER message to the first DU, in response to the third INITIAL UL RRC MESSAGE TRANSFER message. The four DL RRC MESSAGE TRANSFER message includes an RRC Reject (RRCReject) message responding to the third RRCReestablishment message. In this case, the first CU discards (or ignores) the fourth CellGroupConfig. The first DU transmits the RRCReject message or the RRCReestablishmentReject message to the third UE. The third UE enters a RRC_IDLE state from the RRC_CONNECTED state, in response to the RRCReject message. The third UE releases the UE AS context, in response to the RRCReject message or entering the RRC_IDLE state.

In one example, the first/second/third/fourth DL RRC MESSAGE TRANSFER messages include signaling radio bearer (SRB) identities, and do not include data radio bearer (DRB) identities. In one example, the third DL RRC MESSAGE TRANSFER message includes a SRB identity and a DRB identity.

Figure 4:
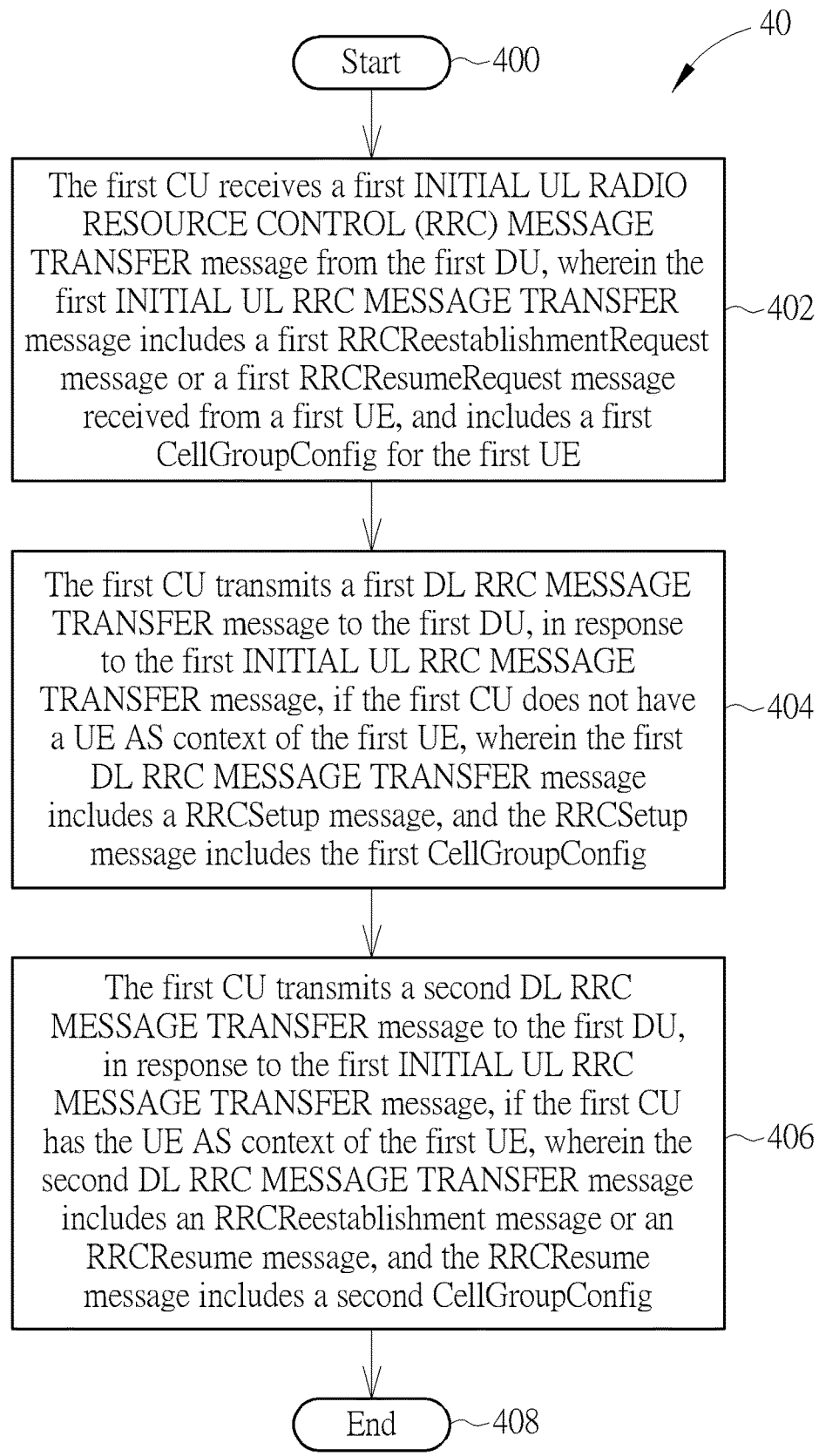
FIG. 4 is a flowchart of a process according to an example of the present invention.

A process 40 in FIG. 4 is utilized in a network including a first CU and a first DU to handle a fallback, and includes the following steps:

Step 400: Start.

Step 402: Same as the step 302.

Step 404: The first CU transmits a first DL RRC MESSAGE TRANSFER message to the first DU, in response to the first INITIAL UL RRC MESSAGE TRANSFER message, if the first CU does not have a UE AS context of the first UE, wherein the first DL RRC MESSAGE TRANSFER message includes a RRCSetup message, and the RRCSetup message includes the first CellGroupConfig.

Step 406: The first CU transmits a second DL RRC MESSAGE TRANSFER message to the first DU, in response to the first INITIAL UL RRC MESSAGE TRANSFER message, if the first CU has the UE AS context of the first UE, wherein the second DL RRC MESSAGE TRANSFER message includes an RRCReestablishment message or an RRCResume message, and the RRCResume message includes a second CellGroupConfig.

Step 408: End.

According to the process 40, after receiving the first INITIAL UL RRC MESSAGE TRANSFER message from the first DU, the first CU transmits different DL RRC MESSAGE TRANSFER messages to the first DU according to the condition that whether the first CU has the UE AS context of the first UE or not.

Realizations of the process 40 are not limited to the above description. The examples for the process 30 may be applied to the process 40.

Figure 5:
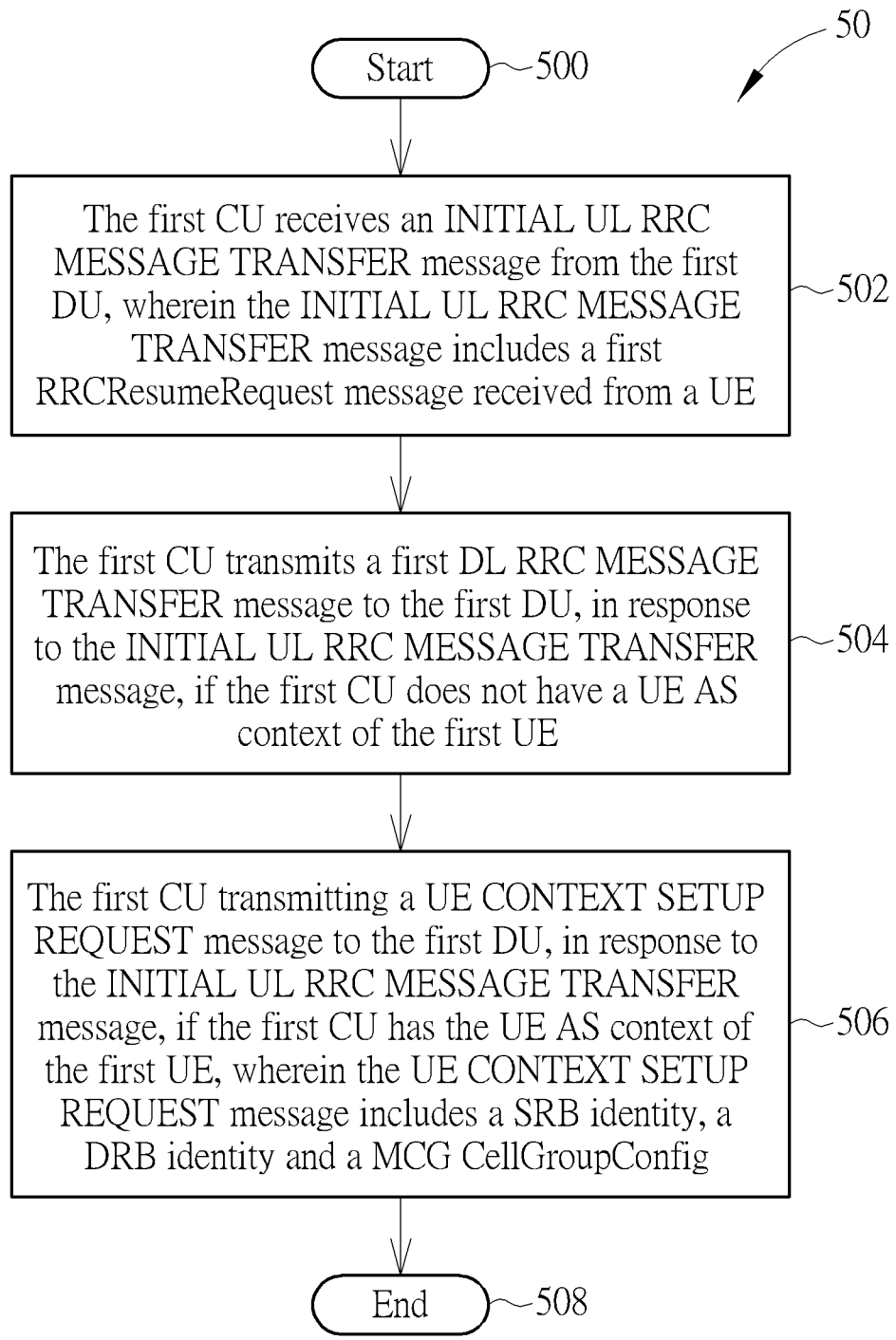
FIG. 5 is a flowchart of a process according to an example of the present invention.

A process 50 in FIG. 5 is utilized in a network including a first CU and a first DU to handle a fallback, and includes the following steps:

Step 500: Start.

Step 502: The first CU receives an INITIAL UL RRC MESSAGE TRANSFER message from the first DU, wherein the INITIAL UL RRC MESSAGE TRANSFER message includes a first RRCResumeRequest message received from a UE.

Step 504: The first CU transmits a first DL RRC MESSAGE TRANSFER message to the first DU, in response to the INITIAL UL RRC MESSAGE TRANSFER message, if the first CU does not have a UE AS context of the first UE.

Step 506: The first CU transmitting a UE CONTEXT SETUP REQUEST message to the first DU, in response to the INITIAL UL RRC MESSAGE TRANSFER message, if the first CU has the UE AS context of the first UE, wherein the UE CONTEXT SETUP REQUEST message includes a SRB identity, a DRB identity and a master cell group (MCG) CellGroupConfig.

Step 508: End.

According to the process 50, after receiving the INITIAL UL RRC MESSAGE TRANSFER message from the first DU, the first CU transmits the first DL RRC MESSAGE TRANSFER message or the UE CONTEXT SETUP REQUEST message for the first UE to the first DU, according to the condition that whether the first CU has the UE AS context of the first UE or not.

Realizations of the process 50 are not limited to the above description. Examples for the process 30 may be applied to the process 50. The following examples may be applied to the process 50.

In some implementations, the INITIAL UL RRC MESSAGE TRANSFER message includes or does not include a first CellGroupConfig for the first UE. In one example, the first DL RRC MESSAGE TRANSFER message includes an RRCReject message for the first UE, if the first CellGroupConfig is not included in the INITIAL UL RRC MESSAGE TRANSFER message. In one example, the first DL RRC MESSAGE TRANSFER message includes an RRCSetup message for the first UE, if the first CellGroupConfig is included in the INITIAL UL RRC MESSAGE TRANSFER message. In one example, the first DL RRC MESSAGE TRANSFER message includes an RRCReject message irrespective of the first CellGroupConfig included or not in the INITIAL UL RRC MESSAGE TRANSFER message. In one example, the first CU receives a UE CONTEXT SETUP RESPONSE message responding to the UE CONTEXT SETUP REQUEST message, from the first DU. The UE CONTEXT SETUP RESPONSE message includes a second CellGroupConfig for the first UE. The first CU transmits a second DL RRC MESSAGE TRANSFER message including a RRCResume message to the first DU. The RRCResume message includes the second CellGroupConfig. The first DU transmits the first UE the RRCResume message.

The following examples may be applied to the processes 30-50.

In one example, the RRCSetup message configures a SRB 1 but does not configure a SRB2. For example, the RRCSetup message includes a RadioBearerConfig configuring the SRB 1. In one example, the UE CONTEXT SETUP REQUEST message includes the MCG CellGroupConfig and does not include a SCG CellGroupConfig.

In one example, the first CU receives a UE AS context of a UE (e.g., any UE described above) from a second CU or a BS. In one example, the first CU receives part of the UE AS context from the first DU or a second DU and generates another part of the UE AS context. The UE receives the UE AS context from the first CU, the second CU or the BS before transmitting an RRCResumeRequest message to the first DU.

In one example, the RRCResume message configures a SRB 1, a SRB 2 or a DRB. In some implementations, the RRCResume message includes a first SRB configuration configuring the SRB 1 or a second SRB configuration configuring the SRB 2. In other implementations, the RRCResume message does not include any SRB configurations. The UE uses a first SRB configuration for the SRB 1 and a second SRB configuration for the SRB 2 when receiving the RRCResume message. The first SRB configuration and the second SRB configuration is predetermined (e.g., default) or previously received from the first CU (via a DU), the second CU (via a DU) or the BS.

In one example, the RRCResume message configures a DRB. In some implementations, the RRCResume message includes a DRB configuration configuring the DRB. In other implementations, the RRCResume message does not include a DRB configuration. The UE uses a DRB configuration previously received from the first CU (via a DU), the second CU (via a DU) or the BS when receiving the RRCResume message.

In one example, the UE in the RRC_CONNECTED state receives a RRCRelease message before transmitting the RRCResumeRequest message and after receiving the UE AS context. The RRCRelease message configures the UE to enter the RRC_INACTIVE state. The UE enters the RRC_INACTIVE state from the RRC_CONNECTED state, in response to the RRCRelease message. The UE in the RRC_INACTIVE state starts (or activates) a cell reselection function. The UE in the RRC_CONNECTED state stops (or deactivates) the cell reselection function.

In one example, the UE AS context includes at least one of a RRC configuration, a security context, a Packet Data Convergence Protocol (PDCP) state including a Robust Header Compression (ROHC) state, a Cell Radio Network Temporary Identity (RNTI) (C-RNTI) used in a source primary cell (PCell), a cell identity or a physical cell identity of the source PCell. The RRC configuration includes at least one of an Inactive RNTI (I-RNTI), at least one CellGroupConfig, a RadioBearerConfig or a MeasConfig. The at least one CellGroupConfig includes the MCG CellGroupConfig. The at least one CellGroupConfig further includes a SCG CellGroupConfig. The RadioBearerConfig includes at least one SRB configuration and/or at least one DRB configuration.

In one example, a CellGroupConfig includes at least one of radio link control (RLC) Bearer Configuration(s) (RLC-Bearer-Config(s)), a medium access control (MAC) Cell Group Configuration (MAC-CellGroupConfig), a physical cell group configuration (PhysicalCellGroupConfig), a special cell configuration (SpCellConfig) or a secondary cell configuration.

In one example, the UL RRC MESSAGE TRANSFER message has a SRB identity, and does not have a DRB identity.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a fallback. After receiving an INITIAL UL RRC MESSAGE TRANSFER message from a DU, a CU transmits a corresponding RRCSetup message. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first centralized unit (CU) and a first distributed unit (DU) for handling a fallback, comprising:
   at least one storage device; and
   at least one processing circuit, coupled to the at least one storage device, wherein the at least one storage device stores instructions, and the at least one processing circuit is configured to execute the instructions of:
   the first CU receiving a first INITIAL UPLINK (UL) RADIO RESOURCE CONTROL (RRC) MESSAGE TRANSFER message from the first DU, wherein the first INITIAL UL RRC MESSAGE TRANSFER message comprises a first RRCReestablishmentRequest message or a first RRCResumeRequest message received from a first communication device, and comprises a first CellGroupConfig for the first communication device;
   the first CU transmitting a first DOWNLINK (DL) RRC MESSAGE TRANSFER message to the first DU, in response to the first INITIAL UL RRC MESSAGE TRANSFER message, wherein the first DL RRC MESSAGE TRANSFER message comprises a RRCSetup message, and the RRCSetup message comprises the first CellGroupConfig;
   the first CU receiving a second INITIAL UL RRC MESSAGE TRANSFER message from the first DU, wherein the second INITIAL UL RRC MESSAGE TRANSFER message comprises a second RRCReestablishmentRequest message or a second RRCResumeRequest message from a second communication device, and comprises a second CellGroupConfiq for the second communication device; and
   the first CU transmitting a second DL RRC MESSAGE TRANSFER message to the first DU, in response to the second INITIAL UL RRC MESSAGE TRANSFER message, if the first CU has a UE AS context of the second communication device, wherein the second DL RRC MESSAGE TRANSFER message comprises a RRCReestablishment message responding to the second RRCReestablishmentRequest message.

2. The network of claim 1, wherein the instructions further comprise:
   the first DU transmitting the RRCSetup message to the first communication device;
   the first DU receiving a RRCSetupComplete message from the first communication device, in response to the RRCSetup message; and
   the first DU transmitting a first UL RRC MESSAGE TRANSFER message comprising the RRCSetupComplete message, to the first CU.

3. The network of claim 1, wherein the instructions further comprise:
   the first CU determines to generate the RRCSetup message for the first communication device, if the first CU does not have a user equipment (UE) access-stratum (AS) context of the first communication device.

4. A network comprising a first centralized unit (CU) and a first distributed unit (DU) for handling a fallback, comprising:
at least one storage device; and
at least one processing circuit, coupled to the at least one storage device, wherein the at least one storage device stores instructions, and the at least one processing circuit is configured to execute the instructions of:
the first CU receiving a first INITIAL UPLINK (UL) RADIO RESOURCE CONTROL (RRC) MESSAGE TRANSFER message from the first DU, wherein the first INITIAL UL RRC MESSAGE TRANSFER message comprises a first RRCReestablishmentRequest message or a first RRCResumeRequest message received from a first communication device, and comprises a first CellGroupConfig for the first communication device;
the first CU transmitting a first DOWNLINK (DL) RRC MESSAGE TRANSFER message to the first DU, in response to the first INITIAL UL RRC MESSAGE TRANSFER message, if the first CU does not have a first user equipment (UE) access-stratum (AS) context of the first communication device, wherein the first DL RRC MESSAGE TRANSFER message comprises a RRCSetup message, and the RRCSetup message comprises the first CellGroupConfig; and
the first CU transmitting a second DL RRC MESSAGE TRANSFER message to the first DU, in response to the first INITIAL UL RRC MESSAGE TRANSFER message, if the first CU has the first UE AS context of the first communication device, wherein the second DL RRC MESSAGE TRANSFER message comprises a first RRCReestablishment message or a RRCResume message, and the RRCResume message comprises a second CellGroupConfig;
the first CU receiving a second INITIAL UL RRC MESSAGE TRANSFER message from the first DU, wherein the second INITIAL UL RRC MESSAGE TRANSFER message comprises a second RRCReestablishmentRequest message or a second RRCResumeRequest message from a second communication device, and comprises a third CellGroupConfig for the second communication device; and
the first CU transmitting a third DL RRC MESSAGE TRANSFER message to the first DU, in response to the second INITIAL UL RRC MESSAGE TRANSFER message, if the first CU has a second UE AS context of the second communication device, wherein the third DL RRC MESSAGE TRANSFER message comprises a second RRCReestablishment message responding to the second RRCReestablishmentRequest message.

5. The network of claim 4, wherein the instructions further comprise: the first CU receiving part of the first UE AS context from the first DU or a second DU; and the first CU generating another part of the first UE AS context.

6. A network comprising a first centralized unit (CU) and a first distributed unit (DU) for handling a fallback, comprising:
at least one storage device; and
at least one processing circuit, coupled to the at least one storage device, wherein the at least one storage device stores instructions, and the at least one processing circuit is configured to execute the instructions of:
the first CU receiving an INITIAL UPLINK (UL) RADIO RESOURCE CONTROL (RRC) MESSAGE TRANSFER message from the first DU, wherein the first INITIAL UL RRC MESSAGE TRANSFER message comprises a first RRCResumeRequest message received from a first communication device; the first CU transmitting a first DOWNLINK (DL) RRC MESSAGE TRANSFER message to the first DU, in response to the first INITIAL UL RRC MESSAGE TRANSFER message, if the first CU does not have a first user equipment (UE) access-stratum (AS) context of the first communication device; and
the first CU transmitting a UE CONTEXT SETUP REQUEST message to the first DU, in response to the first INITIAL UL RRC MESSAGE TRANSFER message, if the first CU has the first UE AS context of the first communication device, wherein the UE CONTEXT SETUP REQUEST message comprises a signaling radio bearer (SRB) identity, a data radio bearer (DRB) identity and a master cell group (MCG) CellGroupConfig; the first CU receiving a second INITIAL UL RRC MESSAGE TRANSFER message from the first DU, wherein the second INITIAL UL RRC MESSAGE TRANSFER message comprises a RRCReestablishmentRequest message or a second RRCResumeRequest message from a second communication device, and comprises a first CellGroupConfig for the second communication device; and the first CU transmitting a second DL RRC MESSAGE TRANSFER message to the first DU, in response to the second INITIAL UL RRC MESSAGE TRANSFER message, if the first CU has a second UE AS context of the second communication device, wherein the second DL RRC MESSAGE TRANSFER message comprises a RRCReestablishment message responding to the RRCReestablishmentRequest message.

7. The network of claim 6, wherein the first DL RRC MESSAGE TRANSFER message comprises a RRCReject message, if the INITIAL UL RRC REQUEST TRANSFER message comprises a second CellGroupConfig.

8. The network of claim 6, wherein the first DL RRC MESSAGE TRANSFER message comprises a RRCSetup message, if the INITIAL UL RRC REQUEST TRANSFER message comprises a second CellGroupConfig.

9. The network of claim 6, wherein the instructions further comprise: the first CU receiving a UE CONTEXT SETUP RESPONSE message, in response to the UE CONTEXT SETUP REQUEST message, wherein the UE CONTEXT SETUP RESPONSE message comprises a third CellGroupConfig for the first communication device; and the first CU transmitting a second DL RRC MESSAGE TRANSFER message comprising a RRCResume message, to the first DU, wherein the RRCResume message comprises the third CellGroupConfig.

10. The network of claim 6, wherein the instructions further comprise: the first CU receiving part of the first UE AS context from the first DU or a second DU; and the first CU generating another part of the first UE AS context.

* * * * *